L. E. YOUNIE.
DEMOUNTABLE RIM.
APPLICATION FILED JUNE 21, 1910.
999,138.
Patented July 25, 1911.
2 SHEETS—SHEET 2.
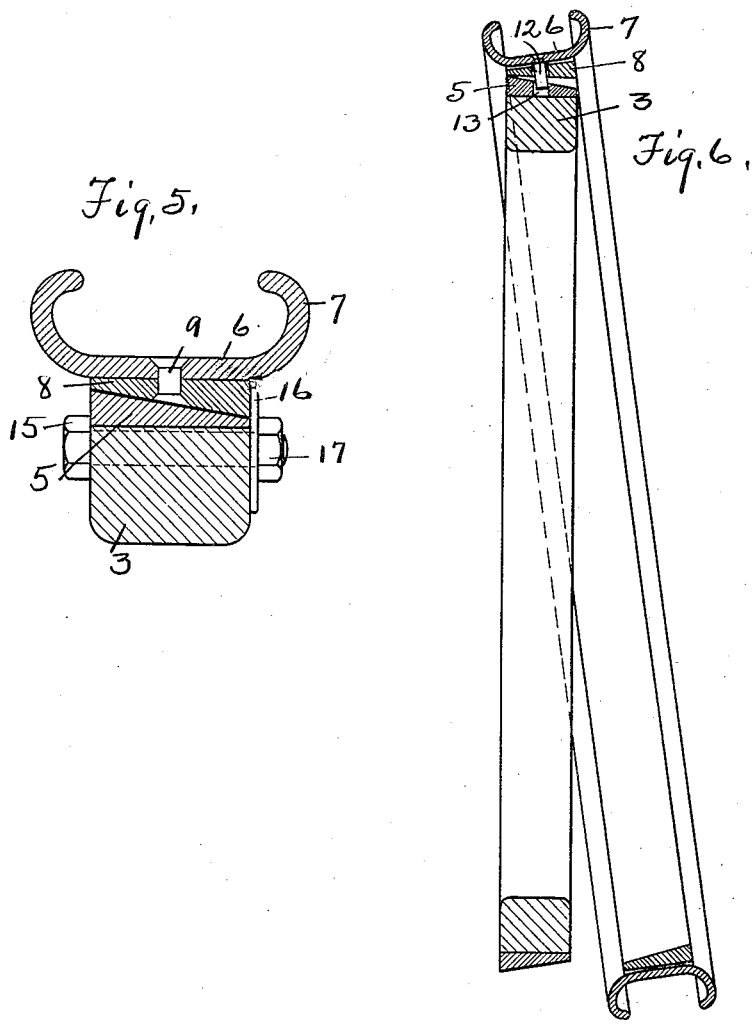
Witnesses
Inventor
Lewis Edward Younie
By H. Chord
Attorney

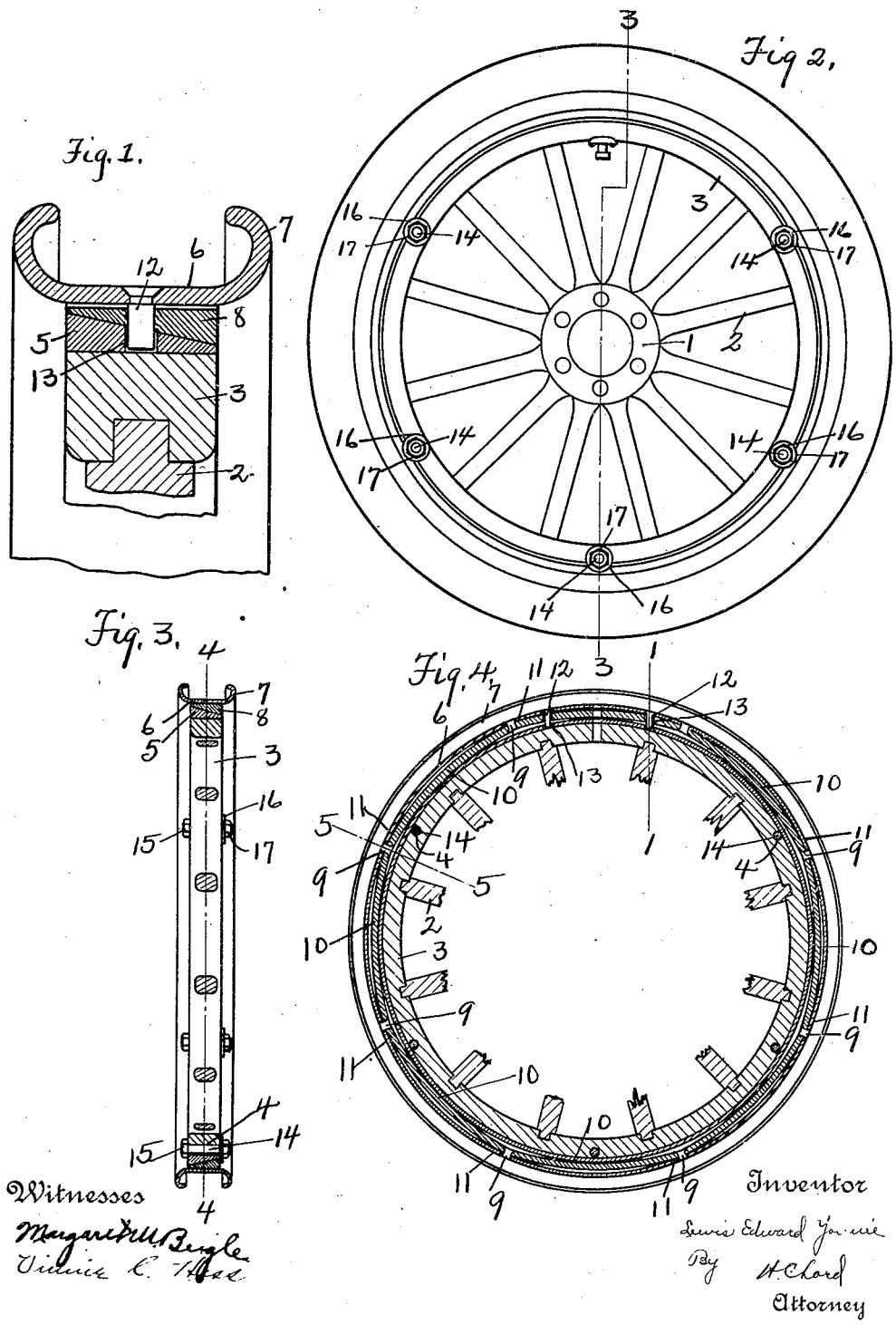

UNITED STATES PATENT OFFICE.

LEWIS EDWARD YOUNIE, OF PORTLAND, OREGON, ASSIGNOR TO THE O'GORMAN YOUNIE COMPANY, OF PORTLAND, OREGON, A CORPORATION OF OREGON.

DEMOUNTABLE RIM.

999,138.  Specification of Letters Patent.  Patented July 25, 1911.

Application filed June 21, 1910. Serial No. 568,153.

*To all whom it may concern:*

Be it known that I, LEWIS EDWARD YOUNIE, a citizen of the United States, residing at Portland, in the county of Multnomah and State of Oregon, have invented new and useful Improvements in Demountable Rims, of which the following is a specification.

This invention relates to demountable rims, and consists in certain improvements in the construction thereof as will be hereinafter fully described and pointed out in the claims.

More particularly, this invention relates to that type of demountable rim on which an inflated tire is carried, and which, in case of injury to the tire on the vehicle, can, without deflation or manipulation of the tire rim, be placed upon the wheel.

The object of the invention is to make a structure by which this may be more easily accomplished, and one in which slight variations in the contour or size of the wheel will not interfere with the satisfactory attachment of the tire rim.

The invention is illustrated in the accompanying drawings as follows:

Figure 1 shows a section on the line 1—1 in Fig. 4; Fig. 2 a side elevation of the wheel with the tire in place thereon; Fig. 3 a section of the rim parts and parts of the wheel on the line 3—3 on Fig. 2; Fig. 4 a section on the line 4—4 in Fig. 3; Fig. 5 a section on the line 5—5 in Fig. 4; Fig. 6 a section on the line 1—1 in Fig. 4.

1 marks the wheel hub; 2 the wheel spokes; 3 the wheel felly. These are of ordinary construction, except the felly has openings 4 extending in an axial direction through it for receiving the fastening bolts hereinafter described. The fixed rim 5 is in the form of a metal annulus, and is shrunk on the felly in the usual manner. It has the tapered or conical outer surface.

The tire rim 6 has the side flanges 7 of a contour to adapt it to any style of tire. In Fig. 2 I show an ordinary form of tire.

An intermediate ring 8 is secured to the rim 6 at several points by means of rivets 9.
The inner surface of this intermediate ring is tapered or conical to conform approximately to the surface of the wheel rim.

I prefer to make the intermediate ring 8 of such a diameter that it will fit loosely within the rim 6. In the drawings, especially Fig. 3, I have somewhat exaggerated this condition. It will be observed that where the outer surface $a$ is of slightly less diameter than the inner surface of the ring,
the ring 8 is flattened to some extent along the portions 10 which are between the rivets 9. On the other hand, the rim 6 is flattened somewhat along the portion 11 in which the rivet is placed. In other words, these parts are somewhat distorted. The result of this is that when the ring 8 is placed on the rim 5, and there is a slight variation in the contour or size, the ring 8, when made of sufficient size to take in the largest diameter of the rim 5, can be readily forced to its place and by reason of the distortion, makes a comparatively tight fit with the rim 5, even though the outer periphery of the rim 5 is somewhat less than the inner periphery of the ring 8.

It will be seen that as the ring 8 is forced up on the rim 5, assuming the rim 5 to be a true circle, the ring 8 is made to assume more nearly a true circle, and on the other hand, the rim 6 is distorted to a greater extent. By reason of this, the ring 8 makes a sufficiently close fit and at the same time permits of this attachment to the wheel rim within the ordinary variations found in such rims. Where it is attempted to make the periphery of the two parts exactly the same, and to make a tight fit, between the ring and the rim 6, so that there is an absolute metal to metal joint, throughout, it is very difficult to get the sizes so nicely calculated as to permit of the proper positioning of the ring 8 on the rim 5.

I prefer to provide the detachable portion, that is the rim 6 and the ring 8 with the interlocking devices formed by the pins 12 which are secured by riveting on the rim 6, and which extend into perforations 13 in the rim 5. Where these interlocking devices are arranged only at one side of the wheel, the pins may be placed in the perforations with the tire rim in the position shown in Fig. 6, and the tire rim then swung into position, in other words the tire rim can be buttoned on to the wheel. Where such pins are used, they, of course, lock that side of the ring 8 in an axial direction with relation to the rim 5. If, therefore, the opposite side of this ring 8 is not brought to the same position relatively to the rim 5, the tire will be out of true to that extent, in other words, will wabble. This construction, therefore, of the ring 8 which permits it to yield readily so as to allow it to be accurately placed axially of the wheel rim is of especial importance where a locking device is used.

The securing bolts 14 extend through the perforations 4 in the felly. The head of the bolt 15 extends outside of the felly, and engages the larger side of the rim 5. A washer 16 is arranged on the bolt at the opposite end and is of sufficient diameter to overlap and engage the larger side of the ring 8. A nut 17 is used for forcing the washer into place, and consequently forcing the ring 8 up on the rim 5 to its position.

I prefer to form the rim 6 and ring 8 of separate pieces, in other words, laminate the tire rim and so secure these parts together that their surfaces may move on each other as they are forced into position. It will readily be understood that it is next to impossible to make the fixed wheel rim 5 so that it forms an exact circle. By making the ring 8 and rim 6 of separate pieces, it is more flexible and more readily yields to the distortion necessary to follow the contour of the wheel rim. This is of great importance when it is understood that the same tire rim is intended to be used on at least any wheel of the same vehicle. By using two dowel pins 12 forming an interlocking rim, this part is compelled to take a position parallel with the wheel rim. Where the dowel pins are arranged close together this still permits of putting the rim in place by first inserting the dowel pins as shown in Fig. 6, and then swinging the rim to position.

What I claim as new is:

1. In a demountable rim, the combination with a fixed rim; having a conical surface; of a tire rim; an intermediate ring secured to the tire rim with the major portion of its surface free to move relatively to the tire rim as the tire rim and ring are flexed, said ring having an inner conical surface, and being thin radially relatively to its width to permit of its yielding to the form of any irregularity in the fixed rim; and means for securing the ring on the fixed rim.

2. In a demountable rim, the combination of a fixed rim having a conical surface; a tire rim; an intermediate ring having an outer periphery fitting loosely within the inner periphery of the tire rim, and secured to the tire rim only at points, said ring having an inner conical surface, and being thin radially relatively to its width to permit of its yielding in a radial direction; and means for securing the ring upon the fixed rim.

In testimony whereof, I have hereunto set my hand in the presence of two subscribing witnesses.

LEWIS EDWARD YOUNIE.

Witnesses:
G. W. STAPLETON,
E. F. SHUMAKER.

---

Copies of this patent may be obtained for five cents each, by addressing the "Commissioner of Patents, Washington, D. C."